United States Patent
Thubert et al.

(10) Patent No.: US 11,470,021 B2
(45) Date of Patent: Oct. 11, 2022

(54) MANAGED MIDLAY LAYERS ON A ROUTED NETWORK

(71) Applicant: Cisco Technology, Inc., San Jose, CA (US)

(72) Inventors: Pascal Thubert, La Colle sur Loup (FR); Eric M. Levy-Abegnoli, Valbonne (FR); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 77 days.

(21) Appl. No.: 16/172,677

(22) Filed: Oct. 26, 2018

(65) Prior Publication Data
US 2020/0136997 A1   Apr. 30, 2020

(51) Int. Cl.
| | |
|---|---|
| H04L 41/0893 | (2022.01) |
| H04L 47/6275 | (2022.01) |
| H04L 49/10 | (2022.01) |
| H04L 49/00 | (2022.01) |
| H04L 47/80 | (2022.01) |
| H04L 45/64 | (2022.01) |
| G06N 20/00 | (2019.01) |

(52) U.S. Cl.
CPC .......... *H04L 49/70* (2013.01); *H04L 41/0893* (2013.01); *H04L 47/6275* (2013.01); *H04L 47/805* (2013.01); *H04L 49/10* (2013.01); G06N 20/00 (2019.01); H04L 45/64 (2013.01)

(58) Field of Classification Search
CPC . H04L 49/70; H04L 41/0893; H04L 47/6275; H04L 47/805; H04L 49/10; H04L 45/64
USPC ................................................ 709/223
See application file for complete search history.

(56) References Cited

U.S. PATENT DOCUMENTS

| | | | | |
|---|---|---|---|---|
| 9,876,715 | B2 * | 1/2018 | Edsall | H04L 12/4633 |
| 2013/0166753 | A1 * | 6/2013 | Armstrong | H04L 12/465 |
| | | | | 709/226 |
| 2015/0124826 | A1 * | 5/2015 | Edsall | H04L 49/10 |
| | | | | 370/392 |
| 2016/0380886 | A1 * | 12/2016 | Blair | H04J 14/0278 |
| | | | | 370/254 |
| 2017/0063648 | A1 | 3/2017 | Nadaf et al. | |
| 2017/0155599 | A1 * | 6/2017 | Vobbilisetty | H04L 49/25 |
| 2018/0139139 | A1 | 5/2018 | Shen et al. | |

FOREIGN PATENT DOCUMENTS

CN      101119503 A    2/2008

* cited by examiner

*Primary Examiner* — James E Springer
*Assistant Examiner* — Patrick F Ngankam
(74) *Attorney, Agent, or Firm* — Patterson + Sheridan, LLP

(57) ABSTRACT

Techniques for providing a non-blocking fabric in a network are described. A network controller determines the network requirement for various network traffic types on the network and determines the allocation of resources across the network needed to establish a midlay, including midlay components on the network. The network controller then establishes the midlay on the network according to the determined allocation. At least one of the midlay components is a virtually non-blocking fabric for high-priority traffic or fully non-blocking fabric for deterministic traffic.

20 Claims, 6 Drawing Sheets

MANAGED MIDLAY LAYERS ON A ROUTED NETWORK

TECHNICAL FIELD

Embodiments presented in this disclosure generally relate to network traffic routing and handling. More specifically, embodiments disclosed herein relate to methods and systems for providing a non-blocking fabric on a midlay established on a network.

BACKGROUND

In computing networks, an ideal connection is the connection of every input element of the network with every output element of the network such that at any time, any input element can transmit network traffic to any output element without being blocked by other network traffic. However, in modern computing networks, the size and complexity of the networks means that connecting every input to every output in a manner to guarantee non-blocking connectivity, requires significant bandwidth and network resources at intermediary connecting layers of the network. Since the cost of such networks is prohibitive, computing networks are designed to be mostly non-blocking, using various software network traffic handling protocols to provide non-blocking connections to as much network traffic as possible while deprioritizing some network traffic. These protocols can cause deadlocks, congestion, wasted bandwidth and network resources, and network traffic jitter.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
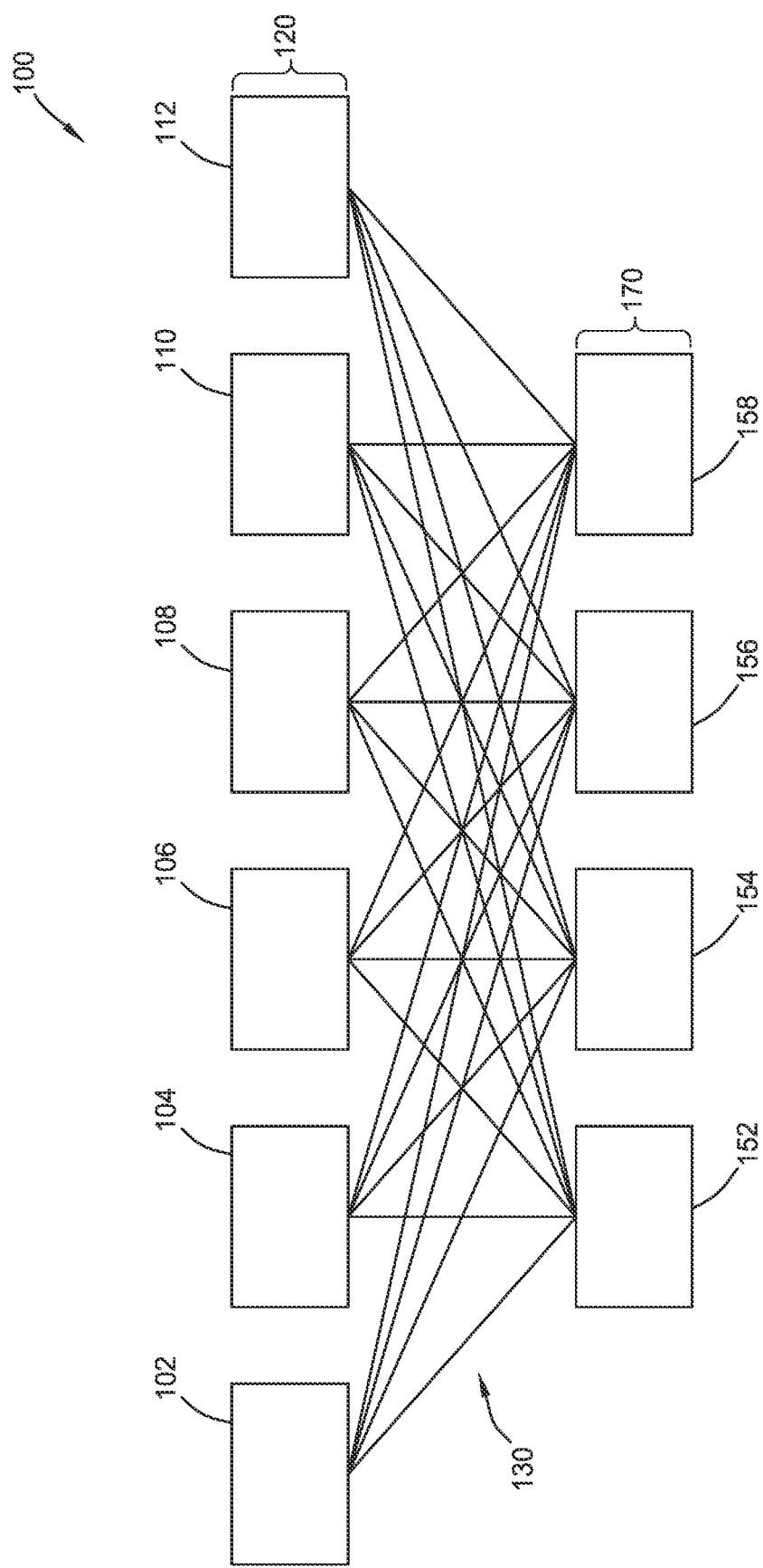
FIG. 1 illustrates a network, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for providing for non-blocking network fabrics. The method including determining, at a network controller for a network, one or more traffic properties for one or more network traffic types at an ingress network element, determining one or more resource allocations for a plurality of network elements for the one or more network traffic types based on the determined one or more traffic properties, and establishing a plurality of midlay components in the network by allocating the determined one or more resource allocations on the plurality of network elements, where at least one of the plurality of midlay components provides a non-blocking network fabric. Other embodiments of this aspect include corresponding computer systems, apparatus, and computer programs recorded on one or more computer storage devices, each configured to perform the actions of the methods.

For example, another embodiment described herein includes a computer program product, the computer program product including: a computer-readable storage medium having computer-readable program code embodied therewith, the computer-readable program code executable by one or more computer processors to perform an operation. The operation includes determining, at a network controller for a network, one or more traffic properties for one or more network traffic types at an ingress network element and determining one or more resource allocations for a plurality of network elements for the one or more network traffic types based on the determined one or more traffic properties. The operation also includes establishing a plurality of midlay components in the network by allocating the determined one or more resource allocations on the plurality of network elements, where at least one of the plurality of midlay components provides a non-blocking network fabric.

Another embodiment described herein includes a system including: a processor; and a memory including instructions which, when executed on the processor, performs an operation. The operation includes determining, at a network controller for a network, one or more traffic properties for one or more network traffic types at an ingress network element and determining one or more resource allocations for a plurality of network elements for the one or more network traffic types based on the determined one or more traffic properties. The operation also includes establishing a plurality of midlay components in the network by allocating the determined one or more resource allocations on the plurality of network elements, where at least one of the plurality of midlay components provides a non-blocking network fabric.

Example Embodiments

As described above, a computing network ideally provides non-blocking redundant connectivity from every input element to every output element. Providing that redundancy consumes hardware resources at every network element. For example, to provide connection redundancy between input/output (I/O) elements of the network (e.g., network leaf switches) and connection network elements (e.g., network spine switches), ports at each layer are required for each redundant connection, such that as the number of connected I/O elements increases, the number of ports required at each connected element increases. This increases the cost of the hardware and other network resources for each connection. For example in a non-blocking Clos network, very large amounts of bandwidth and network resources are requires at a spine or connection layer of the Clos network. In a Clos network, for "n" number of ports on the I/O network elements (e.g., access switches) and "k" number of spine nodes, when "k" is greater than or equal to 2n−1, the Clos network provides for non-blocking fabrics/connections between the network elements. Thus as "n" increases the number of "k" spine nodes also increases. However, as the Clos network grows the feasibility of adding access switches decreases due to the hardware and network limitations.

In some networks, logical and physical grouping of network elements can be used to minimize the number of ports consumed for redundant connectivity, while also providing for the connectivity to be non-blocking. For example, in a fat tree network topology, the groupings of lower level network elements are connected as groups to the upper level connection network elements of the network. In some examples, fat tree networks are a Clos network that is wrapped at the spine/connection layer so the access switches are both ingress and egress switches (input/output switches). Both Clos and fat tree network topologies are used in computing network underlays to provide as much connectivity and redundancy as possible. In some methods however, the connection layer (spine) of the network topologies are not deployed as non-blocking and are instead designed to be "mostly non-blocking" with a ratio of chances for blocking being computed based on an actual number of connection layer network elements (I/O network elements) deployed in the network. Additionally, some networks rely on various protocols to handle traffic and provide various levels of network service to various types of network traffic. For example, current protocols include Priority-Based Flow Control (PFC), which selectively blocks low priority network traffic using PAUSE frames. While PFC can provide for non-blocking traffic in some cases, PFC can also cause deadlocks, (e.g., due to circular buffer dependencies), pause flooding, wasted bandwidth and energy, and seesaw traffic jitter in the network.

The methods and systems described herein establish a midlay on a network, including midlay components, which provide a non-blocking fabric for high-priority network traffic and provide another fabric for other network traffic. The network fabrics on the midlay provide guaranteed routes for non-blocking traffic and thus eliminate the need for traffic control protocols in the network, reducing the network resource requirements and waste of network resources of various types of networks including fat tree networks, Clos networks, and other networks such as core networks, distribution networks, edge networks, etc.

For example, FIG. 1 illustrates a network 100, according to one embodiment. As shown, the network 100 includes a connection layer 120 (overlay) and an input/out (I/O) layer 170 (underlay). The connection layer 120 includes network elements, such as switches, which together form a communication spine for the network 100. For example, the network elements 102, 104, 106, 108, 110, and 112, provide a spine for a fat tree network and provide network connections between the network elements of the I/O layer 170. As also shown, the I/O layer 170 includes network element, such as ingress/egress network elements or switches, which are source and destinations for network traffic in the network 100. For example, the network elements 152, 154, 156, and 158 communicate with each other through the connection layer 120. For example, network element 152 receives network traffic destined for network element 158. The network traffic is the forwarded through the network from 152 to 158 using the connection layer 120.

The connection layer 120 and the I/O layer 170 are connected through connectivity 130. While illustrated as direct connections, the connectivity 130 is representative of the physical and logical connections between the connection layer 120 and the input/output layer 170. For example, the connectivity 130 may include mid-level virtual and physical components such as groups of I/O layer network elements grouped together as virtual network nodes, (e.g., as PODS to preserve network resources, etc.) and or intermediary network elements which receive and forward network traffic.

In some examples, when high-priority network traffic is sent from one network element on the I/O layer 170 to another network element on the I/O layer 170, a network controller and various network traffic protocols executing on the network elements (including the I/O layer 170, the connection layer 120, and connectivity 130) determine how the traffic should be received, processed, and forwarded through the network. This can result in both increased resource needs at the various network elements and increased congestion in the network, such as when the network is processing large amounts of high-priority traffic.

Figure 2:
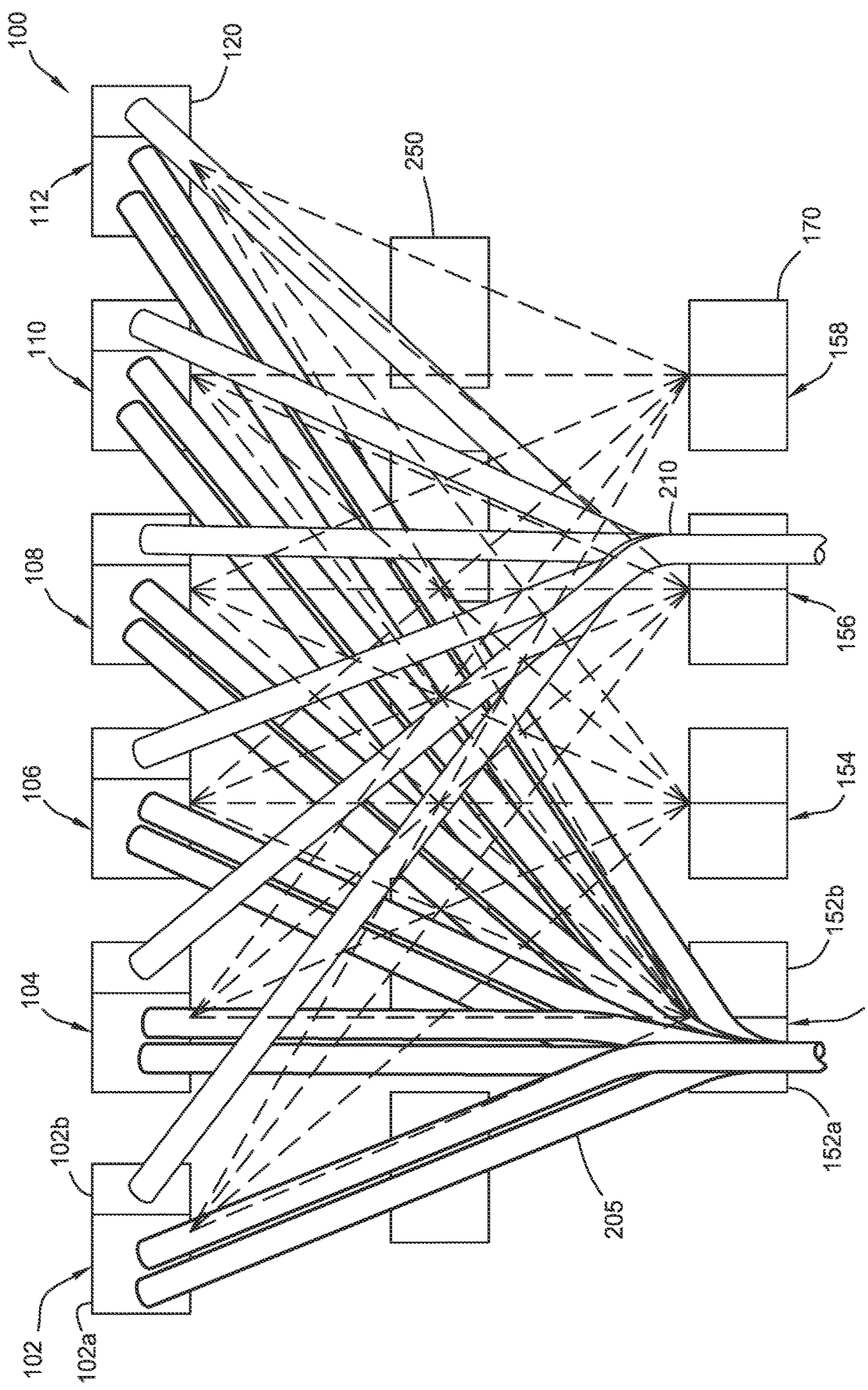
FIG. 2 illustrates a network with a midlay, according to one embodiment.

As shown in FIG. 2, the systems and methods described herein provide for establishing a midlay on the network 100, according to one embodiment. As shown, the midlay 250 includes midlay circuits 205 and 210. In this example, midlay circuit 205 provides a non-blocking fabric for network traffic. In some examples, a network controller for the network 200, such as described in relation to FIG. 6, first determines traffic properties for network traffic types at the I/O layer 170. For example, network requirements and traffic properties for network traffic such as time sensitive traffic are determined to be high-priority traffic, requiring network resources to provide non-blocking network fabrics/connections. Some examples of time sensitive traffic include remote direct memory access (RDMA) using RDMA over Converged Ethernet version two (RoCEv2), industrial applications that require isochronous service (e.g., requiring deterministic and lossless quality of service (QoS)), machine-to-machine applications, voice applications, etc. Other network traffic, such as non-time sensitive traffic is determined to require less network resources since the traffic is not time sensitive in the network.

The network controller for the network 100 also determines an allocation of resources for the midlay circuits 205 and 210 and establishes the midlay 250 and midlay circuits 205 and 210 by allocating the resources on the network elements for the midlay circuits. In some examples, the midlay 250 is represented as an underlay layer to the overlay layer and as an overlay layer to the underlay layer. For example, the overlay sees the midlay as the underlay, and the underlay is a base for the midlay. In one example, if the midlay and underlay are congruent then there is no need to do routing in the midlay and routing tables from the underlay can be used to route the network traffic through the midlay. In some examples, establishing the midlay 250 can also be implemented over the connection layer 120 (underlay) as a multi-topology routing technique, using Virtual Routing and Forwarding (VRF) or similar method for routing the network traffic and Multiprotocol Label Switching (MPLS) or virtual local area network (VLAN) tagging to indicate the midlay in the network fabric. In some examples, the midlay 250 may be implemented using other techniques such as FlexE. In another example, network controller instructs the ingress leaf, (a network element in the I/O layer 170) of which network traffic flows are routed through which midlay.

For example, the midlay circuit 205 is established by allocating network element resources at the connection layer network elements to create virtual nodes on the network elements and virtual connections on the physical connections between virtual nodes. For example, the network element 102 is divided into a number of virtual spine nodes where the allocation 102*a* provides 2 virtual spines nodes (or a determined number as described herein) for the midlay circuit 205, and the allocation 102*b* provides 1 virtual spine node for the midlay circuit 210. The virtual spine nodes in turn provide for midlay circuit 205 to be a non-blocking fabric for high-priority network traffic on the midlay circuit 205 and slower and possibly paused network traffic on the midlay circuit 210. Additionally, the bandwidth of the network element 152 is divided into virtual consumers per network traffic type (e.g., protocols and classes of service) and associated with the virtual spine nodes (e.g., allocations 152*a* and 152*b*). In some examples, the midlay circuit 205 provides for a packet that enters a network element in the network 100 such as a switch, to immediately be sent out by the switch because there is a free (non-blocked) port for it to traverse. In some examples, the latency the network traffic on the midlay circuit 205 is constant and is proportional to the number of hops across the fabric.

In some examples, each of the network elements in the I/O layer 170 and the connection layer 120 will each be configured to provide for the midlay circuits 205 and 210. For example, each of the network elements 152-158 will include a midlay circuit 205 and a midlay circuit 210. In some examples, the midlay circuit 210 is assigned as a default circuit and is allocated the remaining resources of each network element not being utilized by the midlay circuit 205, which provides for non-blocking network fabrics.

Figure 3:
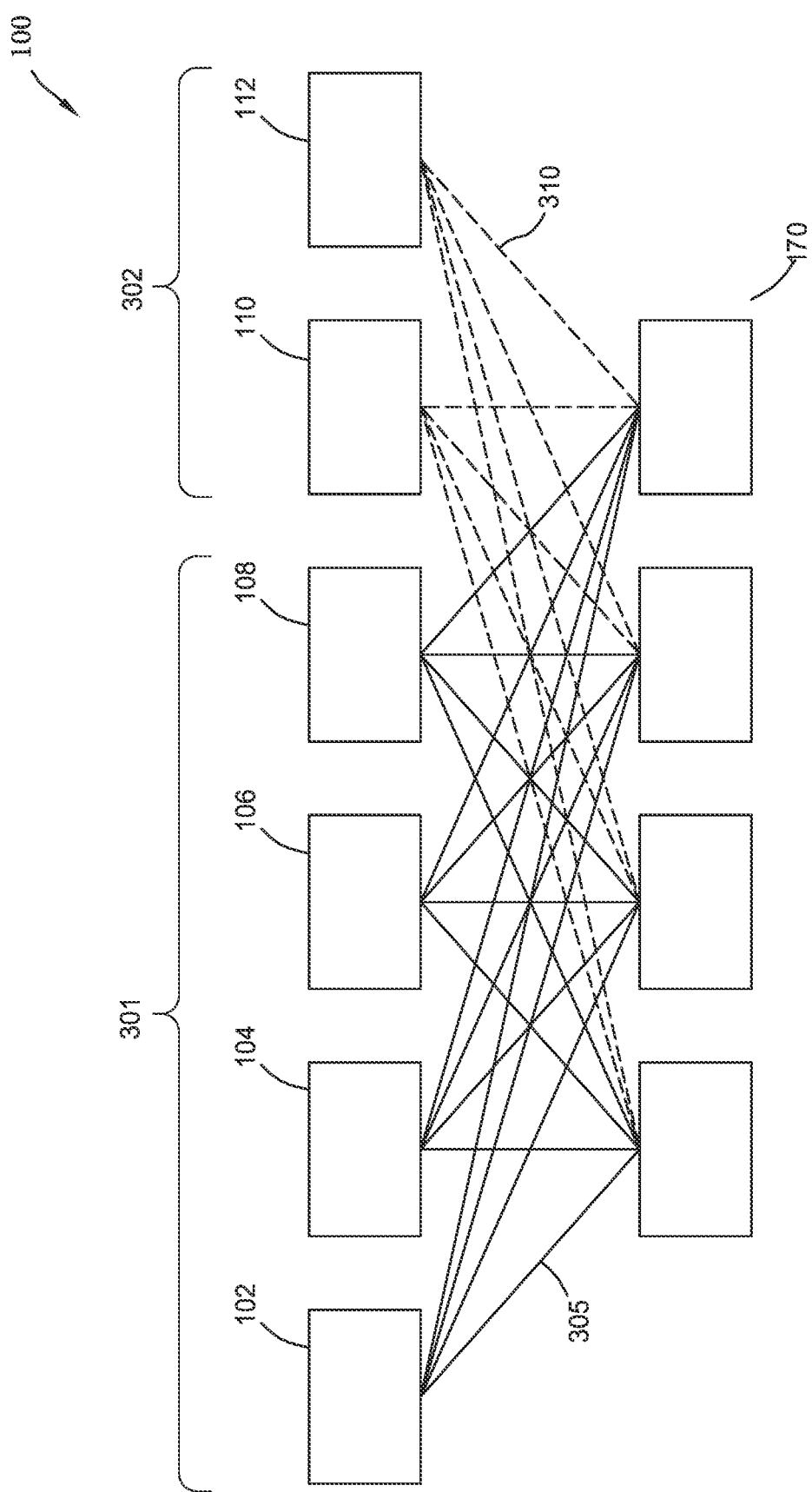
FIG. 3 illustrates a network with a midlay, according to one embodiment.

FIG. 3 illustrates a network with a midlay, according to another embodiment. As shown in FIG. 3, the network controller for the network 100 establishes the midlay 310 by sorting/grouping the connection layer network element into sets which provide different connection services for the network traffic types. For example, the connection layer element set 301 includes the network elements 102-108 and provides for non-blocking fabrics from the I/O layer network elements. For example, the high-priority traffic from the I/O layer 170 will be routed through set 301 via the connections 305 and the default priority traffic will be routed through a set 302 via the connections 310, where the set 302 includes network elements 110 and 112. While illustrated as two sets in FIG. 3, the network elements may be group together in any number of midlay components/sets to provide a midlay for the network traffic.

Figure 4:
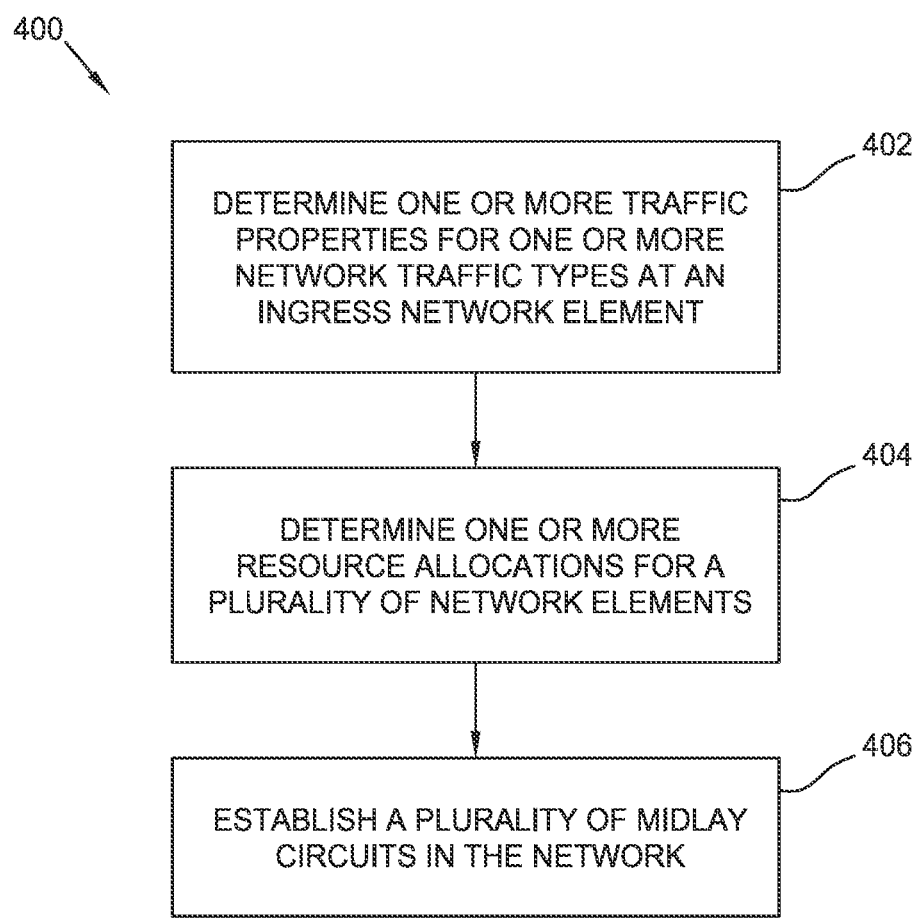
FIG. 4 is a method for providing for non-blocking network fabrics in a network, according to one embodiment.

FIG. 4 is a method for providing for non-blocking network fabrics, according to one embodiment. Method 400 begins at block 402, where a network controller, such as described in relation to FIG. 6, determines one or more traffic properties for one or more network traffic types at an ingress network element. For example, the network controller may determine that network traffic at the ingress network elements, such as the network elements 152-158 include a high-priority traffic type, such as time sensitive network traffic. The network controller also determines other types of network traffic such as lower priority traffic which can be delayed without affecting the services using the network. For end-to-end deterministic Ethernet services which utilize constant-bit-rates (e.g., Time Sensitive Networking (TSN) flows), the traffic properties, such as bandwidth, are part of a Traffic Specification (TSpec) for the network and are accessed by the network controller. Other traffic properties also include network traffic latency and packet loss acceptance, etc.

In some examples, the use of bandwidth for dynamic applications variable bit rate (VBR) is observed by the network controller prior to implementing the midlay and/or during the use of the midlay, which then learns the traffic properties for the traffic types, such as the behavior of high-priority traffic types (e.g., RoCEv2). For example, if congestion is still observed in a non-blocking fabric, then the ratio of network resources dedicated to the non-blocking fabric is increased. In another example, if a non-blocking fabric is over-utilizing resources, network resources can be repurposed for default or normal traffic.

At block 404, the network controller determines one or more resource allocations for a plurality of network elements for the one or more network traffic types based on the determined one or more traffic properties. For example, the network controller, using the TSpec, determines which resources in the network should be allocated for different parts of the midlay (e.g., how much bandwidth is needed for high-priority traffic and how much bandwidth is need for lower priority traffic). For example, a packet sent from network element 152 destined for network element 158 is sent through the connection layer 120. In a non-blocking fabric, the guaranteed bandwidth increases at each hop in the network, while the bandwidth may stay the same for normal priority traffic and/or decrease for lower priority traffic.

For a packet in a high-priority traffic flow on a non-blocking fabric, each hop towards the connection layer 120 and then back towards the I/O layer 170 goes through a sequence of links and/or virtual connections, where the guaranteed bandwidth of the virtual connection expands as it approaches the connection layer 120. For example, if the virtual connections expand by a ratio of 1.2 and the ingress network element has a virtual speed of 1 Gigabytes per second (GBps), the first hop north has a guaranteed bandwidth of 1.2 Gbps, the second hop has a guaranteed bandwidth of 1.44 GBps, etc., until the connection layer is reached in a next hop, which has a guaranteed bandwidth of 1.73 GBps.

In some examples, the network controller utilizes machine learning to determine an optimal resource allocation at each network element in order to provide for non-blocking fabrics. For example, data representing usage of the midlay components and congestion events at each switch may be reported to the network controller from the network elements. This data is then processed through a machine learning process to identify any high-priority traffic experiencing congestion or packet queuing at network elements and determines resource allocations/reallocations to eliminate the congestion.

In some examples, the one or more resource allocations are determined using ratios of connection layer bandwidth divided by ingress bandwidth per network traffic type. For example, for high-priority traffic an oversubscription ratio (R) is determined to be $2n-1/n$ to guarantee a non-blocking connection. For lower priority traffic R can be determined to be $n/n$ or less. For lower priority traffic, any ingress traffic will be buffered at the ingress network element (switch) until resources are available to be transmitted through the network.

At block 406, the network controller establishes a plurality of midlay components in the network by allocating the determined one or more resource allocations on the plurality of network elements, where at least one of the plurality of midlay components provides a non-blocking network fabric. In some examples, the non-blocking fabrics provide guaranteed non-blocking paths for deterministic traffic since the traffic properties and the established midlays can be known to provide certain bandwidths etc. In another example, the non-blocking network fabric provides for virtually non-blocking paths for the high-priority traffic. In some examples, once the midlay circuits are established, all packets of a high-priority traffic type are routed via the established midlay component providing the non-blocking fabric, and all packets of a default priority traffic type are routed via an established midlay component handling other network traffic. In some examples, the established midlay is provided as service to a user or customer and can be managed and changed according to specific user requirements. In some examples, incoming packets from a same flow/same traffic type are all routed all the way to the spine in order to keep the packets in order, and can be distributed across the spine whatever the ingress leaf is, as a benefit from having equal path length across the fabric In another example, if a non-blocking fabric is at a maximum amount of throughput (e.g., the network resources cannot handle more high-priority traffic), excess network traffic may be placed in another midlay and may experience lower latency or congestion.

Figure 5:
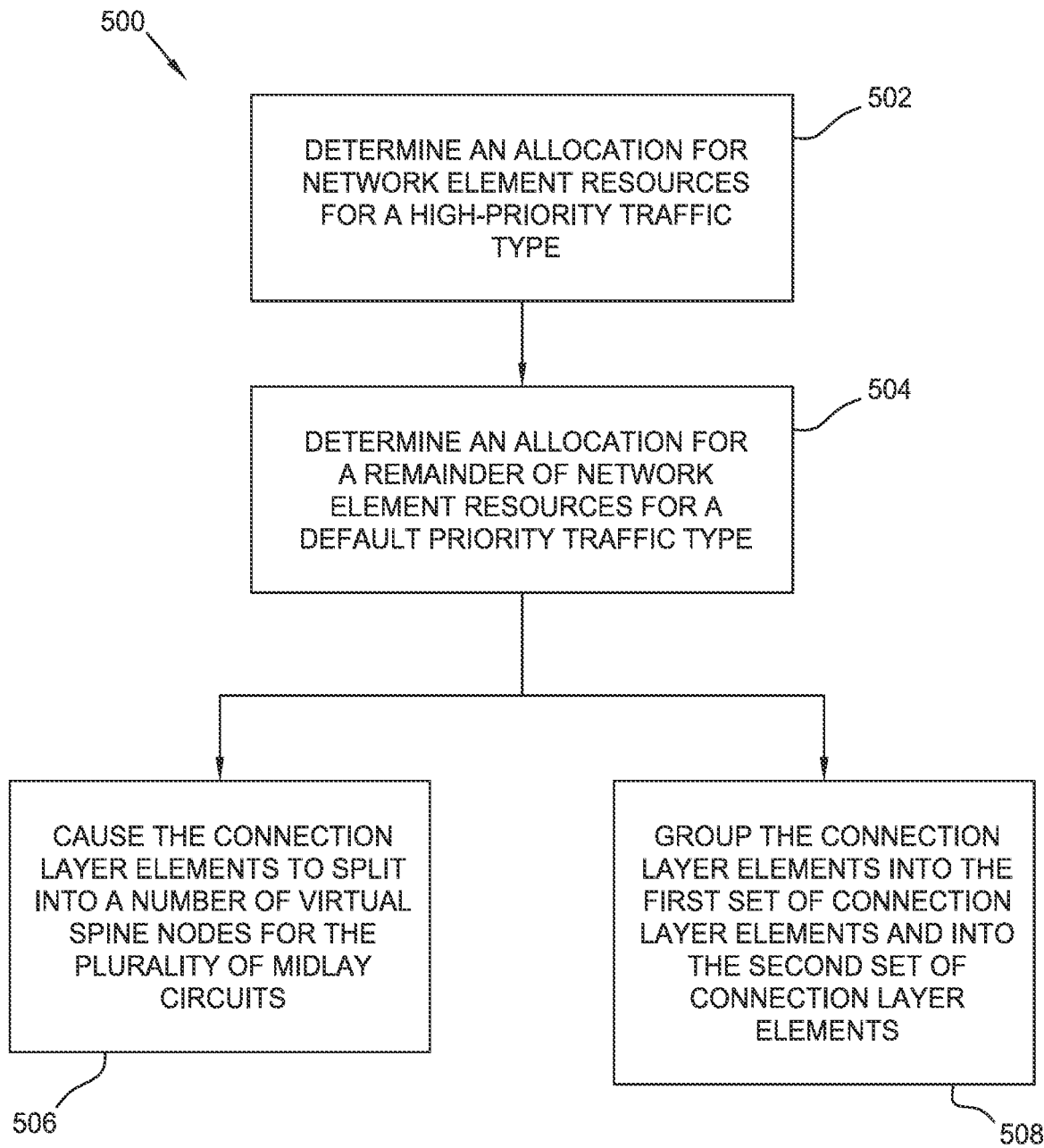
FIG. 5 a method for allocating and establishing midlay components for non-blocking network fabrics, according to one embodiment, according to one embodiment.

FIG. 5 a method for allocating and establishing midlay components for non-blocking network fabrics, according to one embodiment. For example, the method 500 provides an example technique for performing block 406 of the method 400. Method 500 begins at block 502, where the network controller determines an allocation for network element resources for a high-priority traffic type. In some examples, such as described in relation to FIG. 2, the determined allocation for network element resources for a high-priority traffic type include one or more virtual nodes and a number of virtual connections at each of the connection network element layers providing for non-blocking fabrics. In another example, such as described in relation to FIG. 3, the determined allocation for network element resources for a high-priority traffic type include a first set of connection layer network elements providing for non-blocking fabrics.

At block 504, the network controller determines an allocation for a remainder of network element resources for a default priority traffic type. In some examples, the determined allocation for the remainder of network element resources for the default priority traffic type provides for handling other network traffic. For example, as described in relation to FIG. 2, the determined allocation for the remainder of network element resources includes the unallocated resources, such as bandwidth, on the network elements. In another example, such as described in relation to FIG. 3, the determined allocation for the remainder of network element resources includes the second set of connection layer network elements.

When the network element resources for a high-priority traffic type include virtual nodes and virtual connections at connection network element layers providing for non-blocking fabrics, such as the midlay circuits 205 and 210, method 500 continues at block 506, where the network controller causes the connection layer network elements and the physical connections between the connection layer network elements and the I/O layer network elements to split into a number of virtual spine nodes and number of virtual connections for the plurality of midlay components. In some examples, the number of virtual spine nodes and virtual connections provides for non-blocking fabrics for the high-priority traffic and for handling the default priority traffic. In some examples, this is accomplished using techniques such as described in IEEE 802.1 or FlexE to allocate a bounded bandwidth to each of the virtual connections so that the midlay circuits, such as midlay circuits 205 and 210 are physically constrained and never borrow from network resources from each other.

When the network element resources for a high-priority traffic type includes the first set of connection layer network elements, such as set 301, method 500 continues at block 508 where the network controller groups the connection layer network elements into the first set of connection layer network elements (e.g., set 301) and into the second set of connection layer network elements (e.g., set 302).

Figure 6:
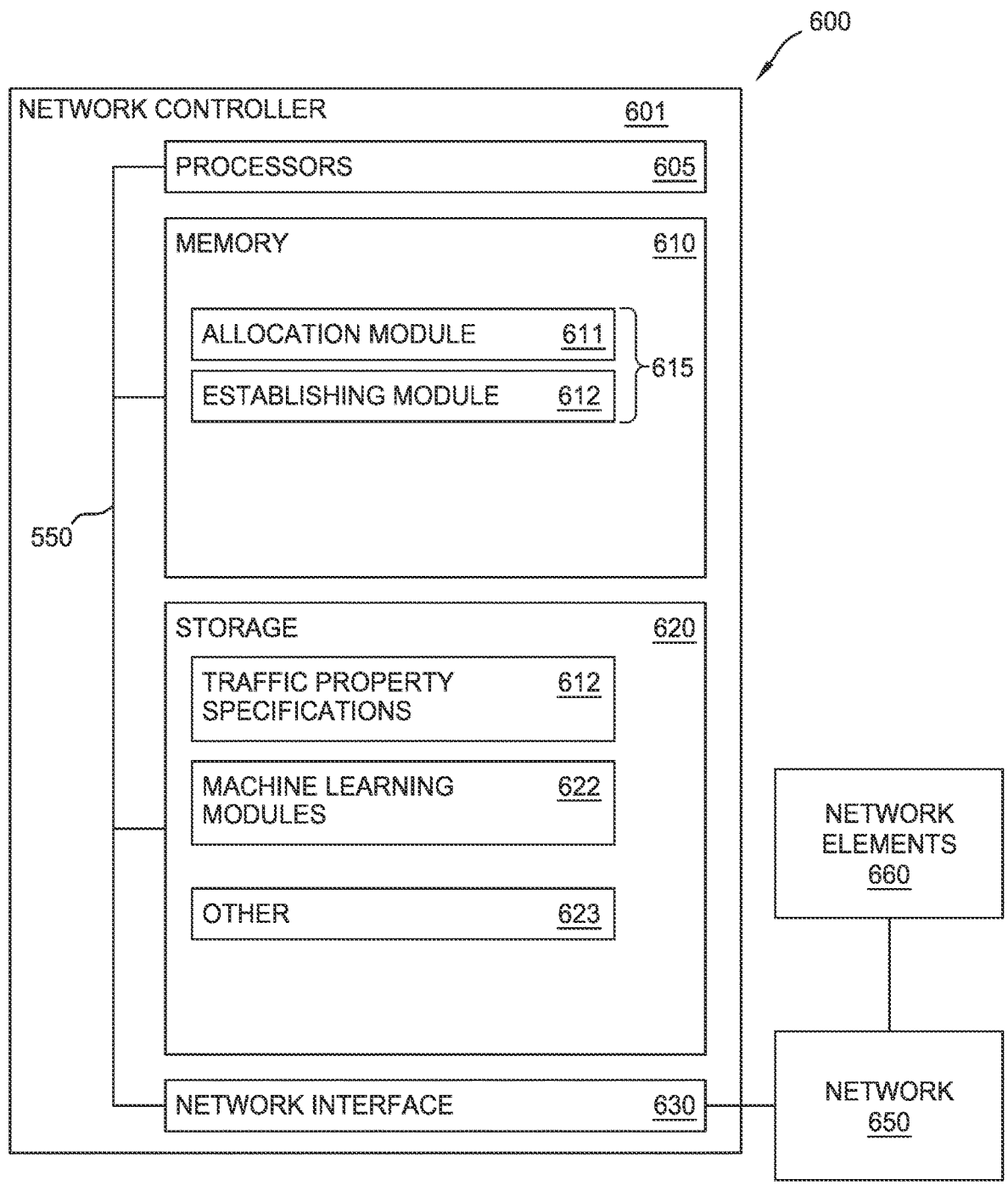
FIG. 6 is a block diagram of a network controller, according to one embodiment described herein.

Turning now to FIG. 6 which depicts a network controller, according to one embodiment described herein. FIG. 6 is a block diagram of a network controller, to provide for non-blocking network fabrics, according to one embodiment. As shown in FIG. 6, the arrangement 600 may include computer 601 configured to execute the various functions of the interfaces described herein. The computer 601 is shown in the form of a general-purpose computing device, but may include a server and/or application executing on a cloud network. The components of computer 601 may include, but are not limited to, one or more processors (or processing units) 605, a system memory 610, a storage system 620, network interface 630 connecting the computer 601 to network 655 and, in turn, network elements 660, and a bus 650 that couples various system components including the system memory 610 and storage system 620 to processors 605 along with various input/output components (not shown). In other embodiments, arrangement 600 is distributed and includes a plurality of discrete computing devices that are connected through wired or wireless networking.

Bus 650 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 601 typically includes a variety of computer system readable media. Such media may be any available media that is accessible by computer 601, and it includes both volatile and non-volatile media, removable and non-removable media.

System memory 610 can include computer system readable media in the form of volatile memory, such as random access memory (RAM) and/or cache memory. Computer 601 may further include other removable/non-removable, volatile/non-volatile computer system storage media. By way of example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a Compact Disc Read-Only Memory (CD-ROM), digital versatile disc-read only memory (DVD-ROM) or other optical media can be provided. In such instances, each can be connected to bus 650 by one or more data media interfaces. As will be further depicted and described below, memory 610 may include at least one program product having a set (e.g., at least one) of program modules that are configured to carry out the functions of various embodiments described herein.

Computer 601 may further include other removable/non-removable, volatile/non-volatile computer system storage media. In some examples storage system 620 may be included as part of memory 610 and may typically provide a non-volatile memory for the networked computing devices, and may include one or more different storage elements such as Flash memory, a hard disk drive, a solid state drive, an optical storage device, and/or a magnetic storage device. For example, storage system 620 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 350 by one or more data media interfaces. Storage 620 may include media for traffic property specifications 621, machine learning models 622, and other information 623 stored for access and use by the computer 601.

Memory 610 may include a plurality of modules 615 for performing various functions described herein. The modules 615 generally include program code that is executable by one or more of the processors 605. As shown, modules 615 include allocation module 611 and establishing module 612. The modules 615 may also interact with each other and storage system 620 to perform certain functions as described herein.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for providing for non-blocking network fabrics comprising:
   determining, at a network controller for a network, one or more traffic properties for one or more network traffic types at an ingress network element;
   determining one or more resource allocations for a plurality of network elements for the one or more network traffic types based on the determined one or more traffic properties, wherein the one or more resource allocations comprise resource allocations at each of the plurality of network elements in the network for one or more midlay circuits through the network; and
   establishing a plurality of midlay components between a connection layer of network elements and an input/output layer of network elements in the network by allocating the determined one or more resource allocations on the plurality of network elements, wherein the midlay components provide a first non-blocking network fabric comprising guaranteed traffic routes, wherein the guaranteed traffic routes comprise a guaranteed bandwidth at each network element, wherein the guaranteed bandwidth increases at each hop in the network towards the connection layer of network elements from the ingress network element.

2. The method of claim 1, wherein determining the one or more resource allocations comprises:
   determining an allocation for network element resources for a high-priority traffic type; and
   determining an allocation for a remainder of network element resources for a default priority traffic type.

3. The method of claim 2, wherein the one or more resource allocations comprise a plurality of virtual spine nodes,
   wherein the determined allocation for network element resources for a high-priority traffic type comprises virtual nodes at the connection layer network elements providing a non-blocking fabric for high-priority traffic;
   wherein the determined allocation for the network elements provide for a guaranteed bandwidth at the network elements for the high priority traffic type, and
   wherein the determined allocation for the remainder of network element resources for the default priority traffic type provides for handling other network traffic.

4. The method of claim 3, wherein establishing the plurality of midlay components comprises:
   causing the connection layer network elements and physical connections between the network elements to split into a number of virtual spine nodes and a number of virtual connections for the plurality of midlay components, wherein the number of virtual spine nodes and the number of virtual connections provides a non-blocking fabric for the high-priority traffic and for handling the default priority traffic.

5. The method of claim 2, wherein the one or more resource allocation comprises a first set of connection layer network elements and a second set of connection layer network elements,
   wherein the determined allocation for network element resources for a high-priority traffic type comprises the first set of connection layer network elements, wherein a number of the connection layer network elements in the first set provides a non-blocking fabric, and
   wherein the determined allocation for the remainder of network element resources for the default priority traffic type comprises the second set of connection layer network elements.

6. The method of claim 5, wherein establishing the plurality of midlay components comprises:
   grouping the connection layer network elements into the first set of connection layer network elements and into the second set of connection layer network elements.

7. The method of claim 1, wherein all packets of a high-priority traffic type are routed via an established midlay component providing a non-blocking fabric, and wherein all packets of a default priority traffic type are routed via an established midlay component handling other network traffic.

8. A computer program product, the computer program product comprising:
a non-transitory computer-readable storage medium having computer-readable program code embodied therewith, the computer-readable program code executable by one or more computer processors to perform an operation, the operation comprising:
determining, at a network controller for a network, one or more traffic properties for one or more network traffic types at an ingress network element;
determining one or more resource allocations for a plurality of network elements for the one or more network traffic types based on the determined one or more traffic properties, wherein the one or more resource allocations comprise resource allocations at each of the plurality of network elements in the network for one or more midlay circuits through the network; and
establishing a plurality of midlay components between a connection layer of network elements and an input/output layer of network elements in the network by allocating the determined one or more resource allocations on the plurality of network elements, wherein the midlay components provide a first non-blocking network fabric comprising guaranteed traffic routes, wherein the guaranteed traffic routes comprise a guaranteed bandwidth at each network element, wherein the guaranteed bandwidth increases at each hop in the network towards the connection layer of network elements from the ingress network element.

9. The computer program product of claim 8, wherein determining the one or more resource allocations comprises:
determining an allocation for network element resources for a high-priority traffic type; and
determining an allocation for a remainder of network element resources for a default priority traffic type.

10. The computer program product of claim 9, wherein the one or more resource allocations comprise a plurality of virtual spine nodes,
wherein the determined allocation for network element resources for a high-priority traffic type comprises virtual nodes at the connection layer network elements providing a non-blocking fabric for high-priority traffic;
wherein the determined allocation for the network elements provide for a guaranteed bandwidth at the network elements for the high priority traffic type, and
wherein the determined allocation for the remainder of network element resources for the default priority traffic type provides for handling other network traffic.

11. The computer program product of claim 10, wherein establishing the plurality of midlay components comprises:
causing the connection layer network elements and physical connections between the network elements to split into a number of virtual spine nodes and a number of virtual connections for the plurality of midlay components, wherein the number of virtual spine nodes and the number of virtual connections provides a non-blocking fabric for the high-priority traffic and for handling the default priority traffic.

12. The computer program product of claim 9, wherein the one or more resource allocation comprises a first set of connection layer network elements and a second set of connection layer network elements,
wherein the determined allocation for network element resources for a high-priority traffic type comprises the first set of connection layer network elements, wherein a number of connection layer network elements in the first set provides for a non-blocking fabric, and
wherein the determined allocation for the remainder of network element resources for the default priority traffic type comprises the second set of connection layer network elements.

13. The computer program product of claim 12, wherein establishing the plurality of midlay components comprises:
grouping the connection layer network elements into the first set of connection layer network elements and into the second set of connection layer network elements.

14. The computer program product of claim 8, wherein all packets of a high-priority traffic type are routed via an established midlay component providing a non-blocking fabric, and wherein all packets of a default priority traffic type are routed via an established midlay component handling other network traffic.

15. A system comprising:
a processor; and
a memory comprising instructions which, when executed on the processor, performs an operation, the operation comprising:
determining, at a network controller for a network, one or more traffic properties for one or more network traffic types at an ingress network element;
determining one or more resource allocations for a plurality of network elements for the one or more network traffic types based on the determined one or more traffic properties, wherein the one or more resource allocations comprise resource allocations at each of the plurality of network elements in the network for one or more midlay circuits through the network; and
establishing a plurality of midlay components between a connection layer of network elements and an input/output layer of network elements in the network by allocating the determined one or more resource allocations on the plurality of network elements, wherein the midlay components provide a first non-blocking network fabric comprising guaranteed traffic routes, wherein the guaranteed traffic routes comprise a guaranteed bandwidth at each network element, wherein the guaranteed bandwidth increases at each hop in the network towards the connection layer of network elements from the ingress network element.

16. The system of claim 15, wherein determining the one or more resource allocations comprises:
determining an allocation for network element resources for a high-priority traffic type; and
determining an allocation for a remainder of network element resources for a default priority traffic type.

17. The system of claim 16, wherein the one or more resource allocations comprise a plurality of virtual spine nodes, wherein the determined allocation for network element resources for a high-priority traffic type comprises virtual nodes at the connection layer network elements providing a non-blocking fabric for high-priority traffic;

wherein the determined allocation for the network elements provide for a guaranteed bandwidth at the network elements for the high priority traffic type, and wherein the determined allocation for the remainder of network element resources for the default priority traffic type provides for handling other network traffic.

18. The system of claim 17, wherein establishing the plurality of midlay components comprises:

causing the connection layer network elements and physical connections between the network elements to split into a number of virtual spine nodes and a number of virtual connections for the plurality of midlay components, wherein the number of virtual spine nodes and the number of virtual connections provides a non-blocking fabric for the high-priority traffic and for handling the default priority traffic.

19. The system of claim 16, wherein the one or more resource allocation comprises a first set of connection layer network elements and a second set of connection layer network elements, wherein the determined allocation for network element resources for a high-priority traffic type comprises the first set of connection layer network elements, wherein a number of connection layer network elements in the first set provides a non-blocking fabric, and wherein the determined allocation for the remainder of network element resources for the default priority traffic type comprises the second set of connection layer network elements.

20. The system of claim 19, wherein establishing the plurality of midlay components comprises:

grouping the connection layer network elements into the first set of connection layer network elements and into the second set of connection layer network elements.

* * * * *